United States Patent
Numata et al.

(10) Patent No.: US 6,706,444 B1
(45) Date of Patent: *Mar. 16, 2004

(54) PROCESS FOR PREPARING LITHIUM MANGANATE IN SPINEL STRUCTURE

(75) Inventors: Koichi Numata, Takehara (JP); Tsuneyoshi Kamada, Takehara (JP)

(73) Assignee: Mitsui Mining & Smelting Company, Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 33 days.

This patent is subject to a terminal disclaimer.

(21) Appl. No.: 09/574,351

(22) Filed: May 19, 2000

(30) Foreign Application Priority Data

May 21, 1999 (JP) .......................................... 11-141722

(51) Int. Cl.$^7$ .......................... H01M 4/50; H01M 4/58; H01M 10/44; H01M 4/02; H01M 4/29

(52) U.S. Cl. .................... 429/224; 429/231.95; 205/59; 423/599

(58) Field of Search .............................. 205/57, 58, 59, 205/60, 61, 62, 63, 64, 65, 66; 429/224, 231.95; 423/599

(56) References Cited

U.S. PATENT DOCUMENTS

| | | | | |
|---|---|---|---|---|
| 5,219,685 A | * | 6/1993 | Taniguchi et al. | 429/217 |
| 5,599,435 A | * | 2/1997 | Li et al. | 205/59 |
| 5,631,104 A | * | 5/1997 | Zhong et al. | 429/224 |
| 5,698,176 A | * | 12/1997 | Capparella et al. | 423/605 |
| 6,383,683 B1 | * | 5/2002 | Nagayama et al. | 429/224 |
| 6,576,215 B1 | * | 6/2003 | Numata et al. | 423/599 |

* cited by examiner

Primary Examiner—Patrick Ryan
Assistant Examiner—Julian Mercado
(74) Attorney, Agent, or Firm—Muserlian, Lucas and Mercanti

(57) ABSTRACT

To electrolydeposited manganese dioxide of which pH being adjusted to a range higher than 2 with either a sodium compound or a potassium compound, a raw lithium material and a compound containing any element selected from a group consisting of aluminum, magnesium, calcium, titanium, vanadium, chromium, iron, cobalt, nickel, copper and zinc to substitute a part of the manganese contained in the electrodeposited manganese dioxide with at least one element selected from the group described above, admixed and then burned.

8 Claims, 1 Drawing Sheet

PROCESS FOR PREPARING LITHIUM MANGANATE IN SPINEL STRUCTURE

FIELD OF THE INVENTION

The present invention is related to a process for preparing lithium manganate in spinel structure, and more particularly to a process for preparing lithium manganate in spine structure, which can suppress the dissolving amount of the manganese therefrom when said lithium manganate is used as an anode material for nonaqueous electrolyte secondary battery and can improve the high temperature property of the secondary battery, such as storage property under high temperature and cycle property at high temperature.

BACKGROUND ART

Due to recent tendency of popularization of portable computers, telephones, etc. and their change to be cordless, demand for secondary batteries as a drive power has been increased. Particularly, nonaqueous electrolyte secondary battery is the most expected battery since it is small in the size and has high energy density. As an anode material to be used for the nonaqueous electrolyte secondary battery which can meet to the requirement as described above, lithium cobaltate ($LiCoO_2$), lithium nickelate ($LiNiO_2$), lithium manganate and the like can be given as the examples. Since these complex oxides generate higher voltage than lithium as much as 4V or more, they can be useful as a battery generating higher energy density.

Out of the complex oxides described above, the theoretical capacity of $LiCoO_2$ and $LiNiO_2$ is more or less 280 mAh/g.

However, the theoretical capacity of $LiMn_2O_4$ is rather small as much as 148 mAh/g, but manganese oxide compounds as the raw material are rich in the availability and cheap, and it has no thermal instability at the time of charging contrary to the case of $LiNiO_2$, and therefore, it seems to be suitable as an anode material for EV use.

However, lithium manganate ($LiMn_2O_4$) in spinel structure gives dissolution of manganese at high temperature range, and it has therefore a problem that the battery property at a high temperature of the lithium manganate in spinel structure, such as storage property and cycle property at a high temperature, is not sufficient.

Therefore, it is an object of the present invention to provide a process for preparing lithium manganate in spinel structure which can suppress the dissolving amount of manganese at charging when it is used as the anode material for nonaqueous electrolyte secondary battery, of which battery property at high temperature range, such as storage property and cycle property at a high temperature, is improved, and to provide an anode material composed of the lithium manganate in spinel structure and nonaqueous electrolyte secondary batteries using the said anode material.

DISCLOSURE OF INVENTION

Improvement in the battery property of the lithium manganate in spinel structure at a high temperature has been tried by substituting the part of manganese or lithium elements with various other elements. The lithium manganate in spinel structure is normally obtained by adding a compound, which contains an element to be used for the substitution, to raw manganese material or raw lithium material and mixing, and then burning the resulting mixture. Whereas, the electrolyzed manganese dioxide is an appropriate raw manganese material for the lithium manganate in spinel structure since it is rich in market availability and is cheap.

Normally, following to electrolysis, the electrolyzed manganese dioxide is subjected to neutralization with ammonia when it is used for manganese dry battery, besides it is subjected to neutralization with caustic soda when it is used for alkaline manganese battery. It is known that a small amount of sodium remains in the electrolyzed manganese dioxide when the electrolyzed manganese dioxide is neutralized with caustic soda, and the amount of remaining sodium depends on the neutralization condition. Similarly, when using potassium instead of sodium for the neutralization, small amount of potassium still remains in the electrolyzed manganese dioxide, and the amount of the potassium depends on the neutralization condition as well.

The inventors of the present invention found that the lithium manganate in spinel structure suitable to achieve the object as described above can be obtained by specifically establishing a neutralization condition for the electrolyzed manganese dioxide and suitable elements to substitute.

The process for preparing the lithium manganate in spinel structure of the present invention is established based on the finding described above, and the process is characterized as constituted of a step to neutralize the electrodeposited manganese dioxide with either a sodium compound or a potassium compound, a step to add a raw lithium material and a compound containing at least one element selected from a group consisting of aluminum, magnesium, calcium, titanium, vanadium, chromium, iron, cobalt, nickel, copper and zinc for substituting the part of the manganese contained in the lithium manganate by at least one element selected from the group described above to the neutralized electrolyzed manganese dioxide and a step to mix and burn the resulting mixture.

The invention is characterized in that the sodium compound or the potassium compound is either a hydroxide compound or a carbonate compound.

The invention is characterized in that the amount of the manganese of which part being substituted by at least one element selected from a group consisting of aluminum, magnesium, calcium, titanium, vanadium, chromium, iron, cobalt, nickel, copper and zinc described in claim 1 is specified to a range of from 0.5 to 15 mol %.

The invention is characterized in that the burning operation in the processes is respectively carried out at a temperature higher than 750° C.

The invention of the anode material for nonaqueous electrolyte secondary battery use is characterized in that the anode material is composed of the lithium manganate in spinel structure obtained according to any of the processes.

The invention is characterized in that the inventive nonaqueous electrolyte secondary battery is constituted of an anode composed of the anode material, an cathode composed of lithium, a lithium alloy and a material capable of occluding and deoccluding lithium and a nonaqueous electrolyte.

BEST MODES FOR CARRYING OUT THE INVENTION

Figure 1:
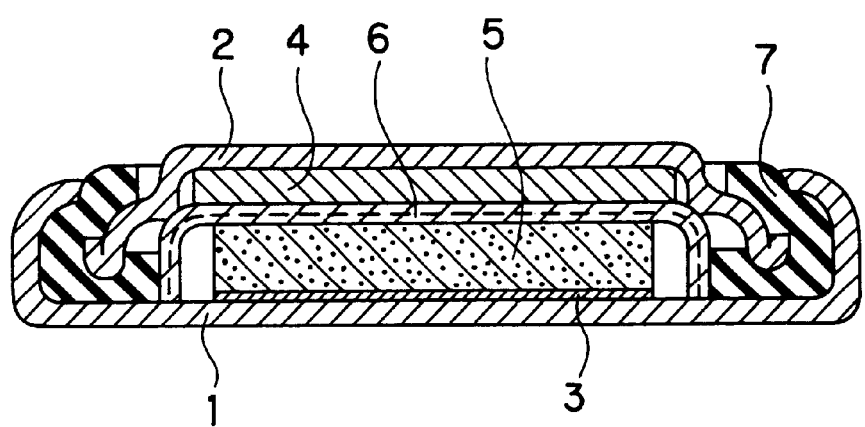
FIG. 1 is a diagram for showing the longitudinal cross section of the coin-type nonaqueous electrolyte secondary battery.

Now, the process for preparing lithium manganate in spinel structure according to the present invention is explained in detail.

In the present invention, electrolyzed manganese dioxide is used as raw manganese material for the lithium manganate in spinel structure.

In the present invention, the electrolyzed manganese dioxide is obtained according to the following process, through it is not limited to the process described below. For example, the electrodeposition of manganese dioxide onto an anode is carried out by using manganese sulfate solution prepared to a fixed concentration for an electrolyte, a carbon plate for a cathode, and titanium plate for an anode, then subjecting them to electrolysis under a fixed current density while heating. Then, the electrodeposited manganese dioxide is exfoliated from the anode, and the exfoliated manganese dioxide is then preferably crushed to a certain particle size, preferably to 5 to 30 μm in average.

The reason to crush the particle of the electrodeposited manganese dioxide to a size range of from 5 to 30 μm is that the lithium manganate in spinel structure being prepared by using the electrodeposited manganese dioxide having an average particle size of 5 to 30 μm as a raw material can be an anode material suitable for forming film without applying an additional crushing, while, in nonaqueous electrolyte secondary batteries, an anode material is prepared in a form of thick film having a thickness of 100 μm more or less, and therefore, the film of the anode material would cause cracking, and formation of the thick film becomes difficult if the particle size of the electrodeposited manganese dioxide is too large.

By means of neutralizing the micronized electrolyzed-manganese dioxide with either sodium or potassium, it is assumed that more uniform distribution of sodium or potassium can be attained easily.

The electrolyzed manganese dioxide being crushed into a desired particle size is neutralized with either sodium or potassium, washed with water and then dried. For the neutralization, hydroxides and carbonates of sodium and potassium can be used. However, application order for said crushing and neutralization may be changed, so that the crushing process may be taken place after the neutralization.

The pH of the electrolyzed manganese dioxide being neutralized is preferably in a range higher than 2, more preferably from 2 to 7.5, and further preferably from 2 to 5.5. Although the dissolving amount of manganese under high temperature is reduced along with the increase of the pH value, initial discharge capacity may be also reduced. Therefore, it is preferable to keep the pH at 7.5 more or less. Whereas, the effect to reduce the dissolving amount of manganese becomes insufficient if the pH value of the electrolyzed manganese dioxide is lower than 2.

In the present invention, the lithium manganate in spinel structure is obtained by admixing a manganese compound of which manganese part being substituted by an element selected from a group consisting of aluminum, magnesium, calcium, titanium, vanadium, chromium, iron, cobalt, nickel, copper and zinc with the electrolyzed manganese dioxide and a lithium material, and then burning the resulting mixture. Whereas, lithium manganate in spinel structure prepared with a mixture of the electrolyzed manganese dioxide and lithium material or the one prepared by admixing a manganese compound, in which the part of manganese is substituted by the other element, to a mixture of other manganese material than the electrolyzed manganese dioxide, for example, an electrolyzed manganese dioxide neutralized with ammonium, and lithium material and burning the resulting mixture cannot give sufficient effect to reduce the dissolving amount of manganese under high temperature.

As examples for the lithium material, lithium carbonate ($Li_2CO_3$), lithium nitrate ($LiNO_3$), lithium hydroxide (LiOH) and the like can be given. Li/Mn mol ratio for the electrolyzed manganese dioxide and the lithium material is preferably in a range of from 0.50 to 0.60.

As examples for the manganese compound of which part of manganese being substituted by an element, oxides and hydroxides of aluminum, magnesium, calcium, titanium, vanadium, chromium, cobalt, nickel, copper and zinc can be given. The amount of manganese substituted by any of the elements above is in a range of from 0.5 to 15 mol % based on the total manganese. When the substituted amount exceeds 15 mol %, the dissolving amount of manganese under high temperature can be reduced, however, it is not preferable since the initial discharge capacity is also reduced in this range. Whereas, at the substituted amount range being lower than 0.5 mol %, the reducing effect is not sufficient.

It is also preferable to crush the electrolyzed manganese dioxide, the lithium material and the manganese compound in which the part of the manganese being substituted by an element either prior to or after the admixing of the material for obtaining more reactive area. In addition, the material weighed and admixed may be used either directly or after preparing it into granules.

The process for the granulation described above is not particularly limited, and the granulation can be done under either wet or dry condition and by any means of extrusion granulation, tumbling granulation, fluid granulation, mixing granulation, spray dry granulation, pressure molding granulation and flake granulation using rolls or the like.

The material obtained as described above is put into a burning kiln and burned at a temperature of from 750 to 1,000° C. to obtain the lithium manganate in spinel structure.

In order to obtain mono-layer lithium manganate in spinel structure, the burning at 500° C. might be enough, however, the growth of granules may not be proceeded if the burning temperature is not enough high, and therefore, a burning temperature higher than 750° C., more preferably higher than 850° C., is required to apply in the present invention. As the burning kiln used in the present invention, rotary kiln, a fixed kiln or the like can be given for example.

For burning time, it is preferable to take more than an hour, more preferably 5 to 20 hours, for achieving the homogeneous reaction.

According to the manner as described above, the lithium manganate in spinel structure being substituted by other element can be obtained and is used as an anode material for nonaqueous electrolyte secondary batteries.

In the nonaqueous electrolyte secondary battery of the present invention, although the materials to be used are not limited to the following examples, the anode material described above, an electrically-conductive material, such as carbon black, and a binding agent, such as teflon binder, are mixed to use as an anode complex material, a lithium alloy or a material capable of occluding and deoccluding lithium, such as carbon, is used as a cathode material, and a solution prepared by mixing a lithium salt, such as lithium hexafluorophosphate ($LiPF_6$), with a mixed solvent, such as ethylenecarbonate-dimethylcarbonate, or the one prepared into an electrolyte in gel is used as the nonaqueous electrolyte.

The nonaqueous electrolyte secondary battery of the present invention can prevent the manganese dissolution under charging state, and therefore, it can improve battery property under high temperature, such as storage property under high temperature and cycle property at high temperature.

EXAMPLES

Now, the present invention is definitely explained with referring the examples described below, however, it should be noted that the scope of the present invention should not limited to the description below.

Example 1

Aqueous solution of manganese sulfate containing sulfuric acid at a concentration of 50 g/l and manganese at a concentration of 40 g/l was prepared as a manganese electrolyte. The manganese electrolyte was heated up to a temperature of 95° C. and electrophoresis was carried out in this manganese electrolyte by using a carbon plate for a cathode and a titanium plate for an anode at a current density of 60 A/M$^2$. Then, manganese dioxide electrodeposited onto the anode was exfoliated, and the exfoliated manganese dioxide was then crushed into tips in a size less than 7 mm and the tips were further pulverized up to fine particles having an average particle size of approximately 20 $\mu$m.

The pulverized manganese dioxide in an amount of 10 kg was washed with 20 liters water. After discarding the washing water used, another 20 liters water was added to the remaining manganese dioxide. Sodium hydroxide in an amount of 30 g was dissolved in the manganese dioxide solution and the solution was subjected to neutralization for 24 hours while stirring. Then, the solution was washed with water, filtrated and dried at 50° C. for 12 hours. pH and sodium content determined according to a method specified in JIS K14677-1984 for the obtained powder are shown in Table 1.

To the manganese dioxide with average particle size of approximately 20 $\mu$m in an amount of 950 g, was added aluminum hydroxide in an amount of 41.7 g, which amount substitutes 5 mol % of the manganese. With the mixture obtained, was mixed lithium carbonate so as to give the Li/Mn mol ratio of 0.54. The mixture was then subjected to burning in a box-type kiln at 850° C. for 20 hours to obtain manganese dioxide in spinel structure. Substituted elements and substitutes are shown in Table 1.

By mixing 80 parts by weight of the manganese dioxide in spinel structure obtained as described above, 15 parts by weight of carbon black as an electrically conductive agent and poly(ethylene tetrafluoride) as a binder, an anode complex substance was prepared.

By using the anode complex substance as described above, a coin-type nonaqueous electrolyte secondary battery was prepared. Namely, to the inner surface of an anode case 1 resistant to organic solvents and made of stainless steel, a current collector 3 similarly made of stainless steel is welded. On the upper surface of the current collector 3, an anode 5 made of the anode complex substance is attached by pressure. At the upper part of the anode 5, a separator 6 made of microporous poplypropylene resin containing an electrolyte is arranged. At the opening of the anode case 1, an opening-closing plate 2 of which beneath part being connected with a cathode made of metal lithium is arranged across a gasket 7 made of polypropylene, and this opening-close plate seals up the battery. The opening-closing plate 2 works also as a cathode terminal and is made of stainless steel as well as the anode case 1. The diameter of the battery is 20 mm and the height of the battery is 1.6 mm. For the electrolyte, a mixture of ethylene carbonate and 1,3-dimethoxyethane prepared with each equivalent volume was used as a solvent, and lithium hexafluorophosphate being dissolved at a concentration of 1 mol/liter was used as a solute.

Charging and discharging tests were conducted for the battery obtained as described above. The charging and discharging tests were carried out at 20° C. at a current density of 0.5 mA/cm$^2$ and voltage range of from 4.3 V to 3.0 V. Besides, the battery was charged at a voltage of 4.3 V and preserved at 80° C. for 3 days, then, preservation property of the battery was checked in view of the discharging capacity based on the capacity maintenance rate. The results on the initial discharge capacity and the capacity maintenance rate under high temperature preservation condition for the batteries are shown in Table 1.

Example 2

The synthesis of the lithium manganate in spinel structure was carried out according to the process described in the Example 1 except changing the additional amount of sodium hydroxide at the neutralization of the electrolyzed manganese dioxide to 60 g. pH, sodium content, substituted elements, and rate of substitution after the neutralization are shown in Table 1. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 1.

Example 3

The synthesis of the lithium manganate in spinel structure was carried out according to the process described in the Example 1 except changing the additional amount of sodium hydroxide at the neutralization of the electrolyzed manganese dioxide to 120 g. pH, sodium content, substituted elements and rate of substitution after the neutralization are shown in Table 1. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 1.

Example 4

The synthesis of the lithium manganate in spinel structure was carried out according to the process described in the Example 1 except changing the additional amount of sodium hydroxide at the neutralization of the electrolyzed manganese dioxide to 190 g. pH, sodium content, substituted elements and rate of substitution after the neutralization are shown in Table 1. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 1.

Example 5

The synthesis of the lithium manganate in spinel structure was carried out according to the process described in the Example 1 except changing the additional amount of sodium hydroxide at the neutralization of the electrolyzed manganese dioxide to 270 g. pH, sodium content, substituted elements and rate of substitution after the neutralization are shown in Table 1. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 1.

Example 6

The synthesis of the lithium manganate in spinel structure was carried out according to the process described in the Example 1 except changing the additional amount of sodium hydroxide at the neutralization of the electrolyzed manganese dioxide to 350 g. pH, sodium content, substituted elements and rate of substitution after the neutralization are shown in Table 1. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 1.

Example 7

The synthesis of the lithium manganate in spinel structure was carried out according to the process described in the Example 1 except changing the additional amount of potassium hydroxide at the neutralization of the electrolyzed manganese dioxide to 45 g. pH, potassium content, substituted elements and rate of substitution after the neutralization are shown in Table 1. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 1.

Example 8

The synthesis of the lithium manganate in spinel structure was carried out according to the process described in the Example 1 except changing the additional amount of potassium hydroxide at the neutralization of the electrolyzed manganese dioxide to 90 g. pH, potassium content, substituted elements and rate of substitution after the neutralization are shown in Table 1. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 1.

Example 9

The synthesis of the lithium manganate in spinel structure was prepared according to the process described in the Example 1 except changing the additional amount of potassium hydroxide at the neutralization of the electrolyzed manganese dioxide to 180 g. pH, potassium content, substituted elements and rate of substitution after the neutralization are shown in Table 1. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 1.

Example 10

The synthesis of the lithium manganate in spinel structure was carried out according to the process described in the Example 1 except changing the additional amount of potassium hydroxide at the neutralization of the electrolyzed manganese dioxide to 290 g. pH, potassium content, substituted elements and rate of substitution after the neutralization are shown in Table 1. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 1.

Example 11

The synthesis of the lithium manganate in spinel structure was carried out according to the process described in the Example 1 except changing the additional amount of potassium hydroxide at the neutralization of the electrolyzed manganese dioxide to 410 g. pH, potassium content, substituted elements and rate of substitution after the neutralization are shown in Table 1. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 1.

Example 12

The synthesis of the lithium manganate in spinel structure was carried out according to the process described in the Example 1 except changing the additional amount of potassium hydroxide at the neutralization of the electrolyzed manganese dioxide to 530 g. pH, potassium content, substituted elements and rate of substitution after the neutralization are shown in Table 1. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 1.

Example 13

The synthesis of the lithium manganate in spinel structure was carried out according to the process described in the Example 2 except changing the burning temperature to 900° C. pH, sodium content, substituted elements and rate of substitution after the neutralization are shown in Table 1. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 1.

Example 14

The synthesis of the lithium manganate in spinel structure was carried out according to the process described in the Example 2 except changing the burning temperature to 700° C. pH, sodium content, substituted elements and rate of substitution after the neutralization are shown in Table 1.

Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 1.

Example 15

The synthesis of the lithium manganate in spinel structure was carried out according to the process described in the Example 2 except changing the amount of the electrolyzed manganese dioxide to 995 g and the amount of aluminum hydroxide to 4.17 g, which amount substitutes 0.5 mol % of the manganese in the electrolyzed manganese dioxide. pH, sodium content, substituted elements and rate of substitution after the neutralization are shown in Table 1. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 1.

Example 16

The synthesis of the lithium manganate in spinel structure was carried out according to the process described in the Example 2 except changing the amount of the electrolyzed manganese dioxide to 850 g and the amount of aluminum hydroxide to 125.1 g, which amount substitutes 15 mol % of the manganese in the electrolyzed manganese dioxide. pH, sodium content, substituted elements and rate of substitution after the neutralization are shown in Table 1. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 1.

Example 17

The synthesis of the lithium manganate in spinel structure was carried out according to the process described in the Example 2 except changing the amount of the electrolyzed manganese dioxide to 950 g and replacing the aluminum hydroxide by magnesium oxide in an amount of 21.6 g, which amount substitutes 5 mol % of the manganese in the electrolyzed manganese dioxide. pH, sodium content, substituted elements and rate of substitution after the neutralization are shown in Table 2. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 2.

Example 18

The synthesis of the lithium manganate in spinel structure was carried out according to the process described in the Example 2 except changing the amount of the electrolyzed manganese dioxide to 950 g and replacing the aluminum hydroxide by calcium hydroxide in an amount of 39.6 g, which amount substitutes 5 mol % of the manganese in the electrolyzed manganese dioxide. pH, sodium content, substituted elements and rate of substitution after the neutralization are shown in Table 2. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 2.

Example 19

The synthesis of the lithium manganate in spinel structure was carried out according to the process described in the Example 2 except changing the amount of the electrolyzed manganese dioxide to 950 g and replacing the aluminum hydroxide by titanium dioxide in an amount of 42.7 g, which amount substitutes 5 mol % of the manganese in the electrolyzed manganese dioxide. pH, sodium content, substituted elements and rate of substitution after the neutralization are shown in Table 2. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 2.

Example 20

The synthesis of the lithium manganate in spinel structure was carried out according to the process described in the Example 2 except changing the amount of the electrolyzed manganese dioxide to 950 g and replacing the aluminum hydroxide by divanadium heptaoxide in an amount of 48.6 g, which amount substitutes 5 mol % of the manganese in the electrolyzed manganese dioxide. pH, sodium content, substituted elements and rate of substitution after the neutralization are shown in Table 2. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 2.

Example 21

The synthesis of the lithium manganate in spinel structure was carried out according to the process described in the Example 2 except changing the amount of the electrolyzed manganese dioxide to 950 g and replacing the aluminum hydroxide by dichromium trioxide in an amount of 40.6 g, which amount substitutes 5 mol % of the manganese in the electrolyzed manganese dioxide. pH, sodium content, substituted elements and rate of substitution after the neutralization are shown in Table 2. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 2.

Example 22

The synthesis of the lithium manganate in spinel structure was carried out according to the process described in the Example 2 except changing the amount of the electrolyzed manganese dioxide to 950 g and replacing the aluminum hydroxide by diiron trioxide in an amount of 42.7 g, which amount substitutes 5 mol % of the manganese in the electrolyzed manganese dioxide. pH, sodium content, substituted elements and rate of substitution after the neutralization are shown in Table 2. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 2.

Example 23

The synthesis of the lithium manganate in spinel structure was prepared according to the process described in the Example 2 except changing the amount of the electrolyzed manganese dioxide to 950 g and replacing the aluminum hydroxide by cobalt hydroxide in an amount of 49.7 g, which amount substitutes 5 mol % of the manganese in the electrolyzed manganese dioxide. pH, sodium content, substituted elements and rate of substitution after the neutralization are shown in Table 2. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 2.

Example 24

The synthesis of the lithium manganate in spinel structure was carried out according to the process described in the Example 2 except changing the amount of the electrolyzed manganese dioxide to 950 g and replacing the aluminum hydroxide by nickel hydroxide in an amount of 49.6 g, which amount substitutes 5 mol % of the manganese in the electrolyzed manganese dioxide. pH, sodium content, substituted elements and rate of substitution after the neutralization are shown in Table 2. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 2.

Example 25

The synthesis of the lithium manganate in spinel structure was carried out according to the process described in the Example 2 except changing the amount of the electrolyzed manganese dioxide to 950 g and replacing the aluminum hydroxide by copper monoxide in an amount of 42.6 g, which amount substitutes 5 mol % of the manganese in the electrolyzed manganese dioxide. pH, sodium content, substituted elements and rate of substitution after the neutralization are shown in Table 2. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 2.

Example 26

The synthesis of the lithium manganate in spinel structure was carried out according to the process described in the Example 2 except changing the amount of the electrolyzed manganese dioxide to 950 g and replacing the aluminum hydroxide by zinc oxide in an amount of 43.5 g, which amount substitutes 5 mol % of the manganese in the electrolyzed manganese dioxide. pH, sodium content, substituted elements and rate of substitution after the neutralization are shown in Table 2. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 2.

Reference Example 1

The synthesis of the lithium manganate in spinel structure was carried out according to the process described in the Example 1 except excluding a step for neutralization of the electrolyzed manganese dioxide, namely no addition of sodium hydroxide. pH, sodium content, substituted elements and rate of substitution after the neutralization are shown in Table 2. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 2.

Reference Example 2

The synthesis of the lithium manganate in spinel structure was carried out according to the process described in the Example 2 except changing the amount of the electrolyzed manganese dioxide to 997.5 g and replacing the aluminum hydroxide by aluminum hydroxide in an amount of 2.09 g, which amount substitutes 0.25 mol % of the manganese in the electrolyzed manganese dioxide. pH, sodium content, substituted elements and rate of substitution after the neutralization are shown in Table 2. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 2.

Reference Example 3

The synthesis of the lithium manganate in spinel structure was carried out according to the process described in the Example 2 except changing the amount of the electrolyzed manganese dioxide to 800 g and replacing the aluminum hydroxide by aluminum hydroxide in an amount of 166.8 g, which amount substitutes 20 mol % of the manganese in the electrolyzed manganese dioxide. pH, sodium content, substituted elements and rate of substitution after the neutralization are shown in Table 2. Further, a coin-type nonaqueous electrolyte secondary battery was prepared by using the lithium manganate in spinel structure as an anode material according to the process described in the Example 1, and the initial discharge capacity and the capacity maintenance rate under preservation at high temperature of the secondary battery were determined. The results are shown in Table 2.

The results for the Examples 1 through 16 are shown in Table 1 and the results for the Comparison Examples 1 through 3 are shown in Table 2.

TABLE 1

| | JIS pH | Na or K | % by weight Na or K | Substituted Element | Amount of Substituted Manganese (mol %) | Initial Discharge Capacity (mAh/g) | Capacity Maintenance Rate under Preservation at High Temperature (%) |
|---|---|---|---|---|---|---|---|
| Example 1 | 2.5 | Na | 0.12 | Aluminum | 5 | 120 | 74 |
| Example 2 | 3.5 | Na | 0.25 | Aluminum | 5 | 118 | 76 |
| Example 3 | 5.0 | Na | 0.50 | Aluminum | 5 | 116 | 79 |
| Example 4 | 6.0 | Na | 0.77 | Aluminum | 5 | 116 | 82 |
| Example 5 | 7.0 | Na | 1.10 | Aluminum | 5 | 113 | 85 |
| Example 6 | 8.0 | Na | 1.50 | Aluminum | 5 | 110 | 88 |
| Example 7 | 2.5 | K | 0.18 | Aluminum | 5 | 119 | 73 |
| Example 8 | 3.5 | K | 0.35 | Aluminum | 5 | 117 | 77 |
| Example 9 | 5.0 | K | 0.80 | Aluminum | 5 | 116 | 79 |
| Example 10 | 6.0 | K | 1.20 | Aluminum | 5 | 114 | 81 |
| Example 11 | 7.0 | K | 1.70 | Aluminum | 5 | 112 | 84 |
| Example 12 | 8.0 | K | 2.20 | Aluminum | 5 | 111 | 88 |
| Example 13 | 3.5 | Na | 0.25 | Aluminum | 0.5 | 122 | 71 |
| Example 14 | 3.5 | Na | 0.25 | Aluminum | 15 | 109 | 85 |
| Example 15 | 3.5 | Na | 0.25 | Aluminum | 5 | 113 | 89 |
| Example 16 | 3.5 | Na | 0.25 | Aluminum | 5 | 119 | 72 |

TABLE 2

| | JIS pH | Na or K | % by weight Na or K | Substituted Element | Amount of Substituted Manganese (mol %) | Initial Discharge Capacity (mAh/g) | Capacity Maintenance Rate under Preservation at High Temperature (%) |
|---|---|---|---|---|---|---|---|
| Example 17 | 3.5 | Na | 0.25 | Magnesium | 5 | 112 | 78 |
| Example 18 | 3.5 | Na | 0.25 | Calcium | 5 | 116 | 76 |
| Example 19 | 3.5 | Na | 0.25 | titanium | 5 | 118 | 73 |
| Example 20 | 3.5 | Na | 0.25 | Vanadium | 5 | 117 | 75 |
| Example 21 | 3.5 | Na | 0.25 | Chromium | 5 | 115 | 82 |
| Example 22 | 3.5 | Na | 0.25 | Iron | 5 | 114 | 81 |
| Example 23 | 3.5 | Na | 0.25 | Cobalt | 5 | 114 | 80 |
| Example 24 | 3.5 | Na | 0.25 | Nickel | 5 | 116 | 79 |
| Example 25 | 3.5 | Na | 0.25 | Copper | 5 | 118 | 74 |
| Example 26 | 3.5 | Na | 0.25 | Zinc | 5 | 117 | 78 |
| Reference Example 1 | 1.8 | Na | 0.02 | Aluminum | 5 | 125 | 61 |
| Reference Example 2 | 3.5 | Na | 0.25 | Aluminum | 0.25 | 123 | 65 |
| Reference Example 3 | 3.5 | Na | 0.25 | Aluminum | 20 | 103 | 87 |

Example 27

The synthesis of the lithium manganate in spinel structure was carried out according to the process described in the Example 1 except changing the average particle size of the electrolyzed manganese dioxide at the pulverization to 5 μm. Then, a coin-type nonaqueous electrolyte secondary battery was prepared by using the lithium manganate in spinel structure as an anode material according to the process described in the Example 1, and the discharge rates of the prepared coin-type nonaqueous electrolyte secondary battery were determined under two current densities, 0.5 mA/cm² and 1.0 mA/cm², and the discharge capacity rate at a current density of 1.0 mA/cm² was indicated as the current loading rate based on 100 value of the discharge capacity at a current density of 0.5 mA/cm². The current loading rates are shown in Table 3.

Example 28

The discharge capacity of the coin-type nonaqueous electrolyte secondary battery prepared in the Example 1 was determined according to the process described in the Example 8. The current loading rates obtained are shown in Table 3.

Example 29

The synthesis of the lithium manganate in spinel structure was carried out according to the process described in the Example 1 except changing the average particle size of the electrolyzed manganese dioxide at the pulverization to 30 μm. Then, a coin-type nonaqueous electrolyte secondary battery was prepared by using the lithium manganate in spinel structure as an anode material according to the process described in the Example 1, and the discharge rates of the prepared coin-type nonaqueous electrolyte secondary battery were determined likewise as described in the Example 8. The current loading rates obtained are shown in Table 3.

Example 30

The synthesis of the lithium manganate in spinel structure was carried out according to the process described in the Example 1 except changing the average particle size of the electrolyzed manganese dioxide at the pulverization to 35 μm. Then, a coin-type nonaqueous electrolyte secondary battery was prepared by using the lithium manganate in spinel structure as an anode material according to the process described in the Example 1, and the discharge rates of the prepared coin-type nonaqueous electrolyte secondary battery were determined likewise as described in the Example 8. The current loading rates obtained are shown in Table 3.

TABLE 3

|  | Average Particle Size (μm) | Current Loading Rate (%) |
|---|---|---|
| Example 27 | 5 | 93 |
| Example 28 | 20 | 88 |
| Example 29 | 30 | 85 |
| Example 30 | 35 | 74 |

Industrial Use

As described above, by means of using the lithium manganate in spinel structure obtained according to the process of the present invention as an anode material for the nonaqueous electrolyte secondary battery, it is possible to suppress the dissolving amount of manganese at charging, to improve battery properties, such as storage property and cycle property under high temperature, and to improve the current loading rate of the battery.

What is claimed is:

1. A process for the preparation of lithium manganate with a spinel structure consisting essentially of the follow steps:

electrically depositing manganese dioxide onto an anode by electrolysis;

washing the electro-deposited manganese dioxide with water and neutralizing the manganese dioxide to a pH of at least 2 by using only a compound consisting of a sodium compound or a potassium compound, as the neutralizing agent;

incorporating lithium material and manganese material into the electro-deposited manganese dioxide to obtain a mixture, adding a compound containing at least one second element selected from the group consisting of aluminum, magnesium, calcium, titanium, vanadium, chromium, iron, cobalt, nickel, copper and zinc into the mixture to replace a portion of manganese in the electro-deposited manganese dioxide by said at least one different type of element; and burning the resulting mixture.

2. The process of claim 1 wherein the sodium or potassium compound is hydroxide or carbamate.

3. The process of claim 1 wherein the amount of manganese replaced by the second element(s) is 0.5 to 15 mole % and is followed by treatment with the lithium material.

4. The process of claim 1 wherein the sintering is effected at a temperature greater than 750° C.

5. An anode for a non-aqueous electrolyte secondary battery made of lithium manganate with a spinel structure produced by the process of claim 1.

6. A non-aqueous electrolyte secondary battery comprised of an anode of claim 5, a non-aqueous electrolyte and a cathode of lithium, a lithium alloy and a material capable of occluding and deoccluding lithium.

7. The process for the preparation of lithium manganate with a spinel structure of claim 1, wherein the pH of the manganese dioxide during the neutralization process is maintained in a range of from 2 to 8.

8. The process for the preparation of lithium manganate with a spinel structure of claim 1, wherein average particle size of the lithium manganate is in a range of from 5 to 30 μm.

* * * * *